United States Patent
Grein et al.

(10) Patent No.: US 8,476,395 B2
(45) Date of Patent: Jul. 2, 2013

(54) POLYPROPYLENE COMPOSITION WITH IMPROVED OPTICS FOR FILM AND MOULDING APPLICATIONS

(75) Inventors: Christelle Grein, Linz (AT); Tonja Schedenig, Enns (AT)

(73) Assignee: Borealis AG, Vienna (AT)

( * ) Notice: Subject to any disclaimer, the term of this patent is extended or adjusted under 35 U.S.C. 154(b) by 159 days.

(21) Appl. No.: 12/990,078

(22) PCT Filed: Jul. 13, 2009

(86) PCT No.: PCT/EP2009/005079
§ 371 (c)(1),
(2), (4) Date: Nov. 29, 2010

(87) PCT Pub. No.: WO2010/009827
PCT Pub. Date: Jan. 28, 2010

(65) Prior Publication Data
US 2011/0065873 A1   Mar. 17, 2011

(30) Foreign Application Priority Data

Jul. 22, 2008 (EP) .................................... 08013199

(51) Int. Cl.
| | | |
|---|---|---|
| C08F 10/06 | (2006.01) | |
| C08F 110/04 | (2006.01) | |
| C08F 210/06 | (2006.01) | |
| C08F 210/16 | (2006.01) | |

(52) U.S. Cl.
USPC ............ 526/351; 502/103; 502/118; 502/152; 526/114; 526/123.1; 526/159; 526/348; 528/396

(58) Field of Classification Search
USPC ........ 526/114, 123.1, 159, 348, 351; 528/396; 502/103, 118, 152
See application file for complete search history.

(56) References Cited

U.S. PATENT DOCUMENTS

| 5,641,828 | A * | 6/1997 | Sadatoshi et al. ............. 524/451 |
|---|---|---|---|
| 2004/0030050 | A1 | 2/2004 | Lin et al. |
| 2007/0185250 | A1 * | 8/2007 | Mader et al. ................. 524/287 |

FOREIGN PATENT DOCUMENTS

| EP | 0 351 208 | 1/1990 |
|---|---|---|
| EP | 0 799 839 | 10/1997 |
| EP | 0 980 877 | 2/2000 |
| EP | 1 270 651 | 1/2003 |
| EP | 1 484 345 | 12/2004 |
| EP | 0 586 109 | 5/2005 |
| EP | 1 801 157 | 6/2007 |
| EP | 1 889 873 | 2/2008 |
| EP | 1 903 070 | 3/2008 |
| EP | 1 923 200 | 5/2008 |
| EP | 1 947 143 | 7/2008 |
| EP | 1 964 873 | 9/2008 |
| WO | WO 03/000754 | 1/2003 |
| WO | WO 2006/018812 | 2/2006 |
| WO | WO 2007/122239 | 11/2007 |

OTHER PUBLICATIONS

Polypropylene cast film, Oct. 2007, Borealis AG.*
Sacchi et al., "Polymerization Stereochemistry with Ziegler-Natta Catalysts Containing Dialkylpropane Diethers: A Tool for Understanding Internal/External Donor Relationships", Maromolecules 1996, 29, 3341-3345.
Sacchi et al., "Role of the Pair of Internal and External Donors in MgCl$_2$-Supported Ziegler-Natta Catalysts", Maromolecules 1996, 24, 6823-6826.
International Search Report mailed Sep. 11, 2009 for International application No. PCT/EP2009/005079.
Written Opinion mailed Sep. 11, 2009 for International application No. PCT/EP2009/005079.
Communication to the European Patent Office dated May 10, 2010 for International application No. PCT/EP2009/005079.

* cited by examiner

*Primary Examiner* — Richard A Huhn
(74) *Attorney, Agent, or Firm* — Fay Sharpe LLP

(57) ABSTRACT

The present invention relates to a polypropylene composition comprising a propylene homopolymer or a propylene random copolymer having at least one comonomer selected from alpha-olefins with 2 or 4-8 carbon atoms and a comonomer content of not more than 8.0 wt %, wherein the propylene homo- or copolymer is polymerized in the presence of a Ziegler-Natta catalyst, and the polypropylene composition has a MWD of 2.0 to 6.0 and an MFR (2.16 kg/230° C.) of 4.0 g/10 min to 20.0 g/10 min, characterized in that the polypropylene composition has not been subjected to a vis-breaking step, the use of the inventive polypropylene composition for the production of a film and/or injection molded articles, a process for preparing a film wherein the inventive polypropylene composition is formed into a film, and wherein the polypropylene composition has not been subjected to a vis-breaking step and a film comprising the inventive polypropylene composition.

11 Claims, No Drawings

POLYPROPYLENE COMPOSITION WITH IMPROVED OPTICS FOR FILM AND MOULDING APPLICATIONS

The present invention refers to a polypropylene composition with low amounts of volatiles and improved optical properties comprising a propylene homo- or random copolymer with at least one comonomer selected from alpha-olefins with 2 or 4-8 carbon atoms and a comonomer content of not more than 8.0 wt % which has been polymerized in the presence of a Ziegler-Natta catalyst. The inventive polypropylene composition is especially applicable for the preparation of films and injection molded articles.

Polyolefins such as polyethylene and polypropylene are widely used for film and packaging applications and increasingly applied also in food and medical area.

It is desired to produce films and molded articles with superior optical properties in gloss, transparency, clarity, and haze. It is well known in the art to optimize those optical properties by subjecting polypropylene compositions applicable for the production of films or molded articles to a vis-breaking step by which the polypropylene chains are broken with peroxide and a higher melt flow rate is achieved. Examples for vis-broken polypropylene compositions applicable for the production of films and molding applications are described in e.g. EP-351208, EP-799839 or EP-980877.

However, several other key properties of polypropylene films and molding application are affected negatively by this vis-breaking step such as the dynamic coefficient of friction (CoF), for which a low value is required for a good winding quality and also the following conversion steps. For good winding quality a CoF of approx. 0.35 (depending on the film properties and film thickness) and for conversion a CoF below 0.2 is technically necessary and therefore a market requirement. In WO 2005/111095 a process for producing a polypropylene film is disclosed in which after vis-breaking a film with a small CoF is obtained.

Further, vis-breaking negatively affects the stiffness especially of molded articles and causes impurities within the film or molded article in the form of volatiles. However, the standards issued by the "Food and Drug Administration" (FDA) or other respective authorities for food and medical applications require low amounts of volatiles within the packaging.

Moreover in case food or medical products shall be packaged it is desired that the sealing of said products can be effected at rather low temperatures to avoid any risk of thermal damage. Thus, especially for film applications good heat sealing properties are desirable. In order to fulfill its function as good heat-sealing agent, a film should have a low seal initiation temperature (SIT).

It is further desirable for pharmaceutical packaging where the material is mostly sterilized that the packaging material is not affected in mechanical and optical properties by the sterilization procedure. The most common sterilization procedures are the use of heat (steam), radiation (beta radiation, electrons or gamma radiation) or chemicals (usually ethylene oxide). Steam sterilization, usually carried out in a temperature range of 120 to 130° C., results mostly in post-crystallisation and physical ageing effects of the polypropylene. Moreover, the material tends to become stiffer and more brittle. Also optical disturbances are severely observed and significantly increase the haze of transparent articles.

It is object of the present invention to overcome the above stated problems and to provide a polypropylene composition which when cast into a film show all above described desired properties.

The present invention resides in the finding that by avoiding vis-breaking of a polypropylene composition emissions and volatiles in the resulting film or molded article can be greatly diminished. It has now surprisingly been found that Ziegler-Natta catalysts can be used for polymerizing propylene homo- or copolymers without need for vis-breaking which are suitable for the production of films and molded articles with a good balance of optics and purity while maintaining good stiffness and toughness.

The present invention therefore relates to a polypropylene composition comprising a propylene homopolymer or a propylene random copolymer having at least one comonomer selected from alpha-olefins with 2 or 4-8 carbon atoms and a comonomer content of not more than 8.0 wt %, wherein the propylene homo- or copolymer is polymerized in the presence of a Ziegler-Natta catalyst, and the polypropylene composition has a MWD of 2.0 to 6.0 and an MFR (2.16 kg/230° C.) of 4.0 g/10 min to 20.0 g/10 min, characterized in that the polypropylene composition has not been subjected to a vis-breaking step.

It is preferred that the polypropylene composition has a weight average molecular weight Mw of 200 to 500 kg/mol, more preferably 250 to 400 kg/mol, and a number average molecular weight Mn of 50 to 150 kg/mol, more preferably 70 to 100 kg/mol, determined by GPC according to ISO 16014-1, and -4

The polypropylene composition has a MWD of 2.0 to 6.0, preferably 3.0 to 5.5, most preferably 3.5 to 5.0.

It is further preferred that the inventive polypropylene composition has a melt flow rate MFR (2.16 kg, 230° C.) of 4.5 to 15 g/10 min, more preferably of 5 to 10 g/10 min.

The MFR (2.16 kg, 230° C.) for polypropylene is determined according to ISO 1133. Melt flow rate and average molecular weight are inversely related to each other, i.e. higher melt flow rate is equivalent to lower average molecular weight and vice versa. Further, the higher the melt flow rate, the lower the viscosity of the polymeric material.

It has surprisingly been found that the inventive polypropylene composition shows an extremely low amount of volatiles and concurrently provides good optical properties especially in gloss, transparency, haze and clarity before and after sterilization when cast into a film or molded article although the inventive polypropylene composition is not subjected to a vis-breaking step. Further, the articles made from the inventive polypropylene composition maintain good mechanical properties especially in behalf of stiffness and toughness and moreover have a low coefficient of friction.

Preferably, the polypropylene composition has an amount of volatiles of micrograms carbon/g or less, more preferably 40 micrograms carbon/g or less, most preferably 30 micrograms carbon/g or less, determined according to VDA 277.

Films made of the inventive polypropylene compositions suitably show good sealing properties.

Thus, the polypropylene composition preferably has a sealing initiation temperature (SIT) of less than 135° C., more preferably less than 133° C. when cast into a film with a thickness of 50 micrometers.

It is further preferred that the polypropylene composition has an interval between SIT and the sealing end temperature (SET) of at least 6° C., more preferably at least 7° C., when cast into a film with a thickness of 50 micrometers. Furthermore, articles made of the inventive polypropylene compositions preferably have excellent optical properties in gloss, transparency, haze and clarity, determined according to ASTM D 1003/92.

Thus, it is preferred that the inventive polypropylene composition has a gloss of at least 110%, more preferably more than 112%, when cast into a film with a thickness of 50 micrometers.

Further, the polypropylene composition preferably has a transparency of at least 94.0%, more preferably at least 94.2%, when cast into a film with a thickness of 50 micrometers.

Still further, the polypropylene composition preferably has a haze of not more than 3.5%, more preferably not more than 3.3%, when cast into a film with a thickness of 50 micrometers.

It is additionally preferred that the polypropylene composition has a clarity of at least 96.0%, more preferably 96.3%, when cast into a film with a thickness of 50 micrometers.

Preferably, the articles made from the inventive polypropylene compositions remain their good optical properties even after sterilization, preferably steam sterilization and pasteurization.

Steam sterilization is carried out in the art between 120° C. and 130° C., preferably at 121° C. for 10 minutes to 2 hours. Pasteurization is carried out at a temperature between 60 and 90° C., preferably at 70° C. for 50 to 100 hours.

The sterilization methods used herein are firstly steam sterilization carried out at 121° C. for 30 min and secondly pasteurization carried out at 70° C. for 72 hours.

After steam sterilization, the polypropylene composition preferably shows a transparency of at least 93.0%, more preferably of at least 93.5% with a loss of transparency in comparison to the transparency before sterilization of preferably less than 0.6% when cast into a film with a thickness of 50 micrometers.

After steam sterilization, the polypropylene composition further preferably shows a haze of not more than 6.5%, more preferably of at least 5.8% with an increase of haze in comparison to the haze before sterilization of preferably less than 4.0% when cast into a film with a thickness of 50 micrometers.

After steam sterilization, the polypropylene composition preferably shows a clarity of at least 95.0%, more preferably of at least 95.5% with a loss of clarity in comparison to the clarity before sterilization of preferably less than 1.5% when cast into a film with a thickness of 50 micrometers.

After pasteurization, the polypropylene composition preferably shows a transparency of at least 93.5%, more preferably of at least 93.8% with a loss of transparency in comparison to the transparency before sterilization of preferably less than 0.3% when cast into a film with a thickness of 80 micrometers.

After pasteurization, the polypropylene composition further preferably shows a haze of not more than 5.0%, more preferably not more than 4.5% with an increase of haze in comparison to the haze before sterilization of preferably less than 0.3% when cast into a film with a thickness of 80 micrometers.

After pasteurization, the polypropylene composition preferably shows a clarity of at least 96.0%, more preferably of at least 96.5% with a loss of clarity in comparison to the clarity before sterilization of preferably less than 0.3% when cast into a film with a thickness of 80 micrometers.

Suitably, articles made of polypropylene compositions of the present invention further show good and uniform mechanical properties especially in stiffness.

Thus, the inventive polypropylene composition preferably has a tensile modulus of at least 450 MPa, more preferably of at least 500 MPa as well in machine direction as in transverse direction determined according to ISO 527-3, when cast into a film with a thickness of 50 micrometers.

Furthermore, the polypropylene composition preferably has an elongation at break both in machine and in transverse direction of at least 500%, more preferably at least 550% determined according to ISO 527-3, when cast into a film with a thickness of 50 micrometers.

Further, articles made from the inventive polypropylene composition preferably show a good winding quality by having a low coefficient of friction (CoF) determined according to DIN 53 375.

Thus, in one preferred embodiment the polypropylene composition comprising a propylene random copolymer has a CoF which is not more than 0.300, more preferably not more than 0.250 one day after casting into a film with a thickness of 30 micrometers.

Further, in this embodiment the CoF is not more than 0.115, more preferably not more than 0.110 three days after casting into a film with a thickness of 30 micrometers.

In another preferred embodiment, the polypropylene composition comprising a propylene homopolymer has a CoF which is not more than 0.400, more preferably not more than 0.360 seven days after casting into a film with a thickness of 30 micrometers.

Further, in this embodiment the CoF is not more than 0.250, more preferably not more than 0.240 21 days after casting into a film with a thickness of 30 micrometers.

The propylene homo- or random copolymer of the present invention may consist of a single propylene homopolymer or random copolymer, but may also comprise a mixture of different propylene homo- and/or random copolymers whereby also only different homopolymers or only different random copolymers may be mixed. It may also comprise a mixture of at least one homopolymer with at least one random copolymer. This also applies for all preferred embodiments of the inventive propylene homo- or copolymer.

It is preferred that the propylene homo- or copolymer has a content of xylene solubles of not more than 8.0 wt %, more preferably from 1.0 wt % to 7.0 wt %.

In one preferred embodiment, the inventive propylene homo- or random copolymer comprises, more preferably consists of a propylene homopolymer.

In a further preferred embodiment, the inventive propylene homo- or random copolymer comprises, more preferably consists of a propylene random copolymer with a comonomer content of 0.5 to 8.0 wt %, more preferably of 1.0 to 7.5 wt %, most preferably of 1.5 to 7.0 wt %.

It is further preferred that the propylene random copolymer has a comonomer selected from ethylene, butene, hexene, 1-methyl-4-pentene, and octene. Most preferred is ethylene.

The polymerization process for the production of the inventive propylene homo- or random copolymer may be a continuous process or a batch process utilizing known methods and operating in liquid phase, optionally in the presence of an inert diluent, or in gas phase or by mixed liquid-gas techniques.

Accordingly, the propylene homo- or random copolymers may be produced by single- or multistage process polymerizations of propylene or propylene and at least one comonomer selected from alpha-olefins with 2 or 4-8 carbon atoms such as bulk polymerization, gas phase polymerization, slurry polymerization, solution polymerization or combinations thereof using Ziegler-Natta catalysts described below. Preferably, a homo- or copolymer is made either in one loop or two loop reactors or in a combination of loop and gas phase reactor. Those processes are well known to one skilled in the art.

Preferred reactor arrangements for producing a propylene homo- or random copolymer according to the invention are two consecutive loop reactors or a loop reactor followed by a gas phase reactor.

Before the catalyst system is used in the actual polymerization process it is typically pre-polymerized with small amounts of alpha-olefins, preferably propylene, in order to enhance catalyst performance and to improve the morphology of the end product.

In the first polymerization step of the process the optionally pre-polymerized catalyst system and a monomer feed comprised of propylene and optionally at least one comonomer selected from an alpha-olefin with 2 or 4 to 8 carbon atoms is fed to a reactor.

Polymerization can be carried out in the presence of the catalyst system at temperatures lower than 110° C., preferably between 60 and 100° C., more preferably between 70 to 90° C. and pressures in the range of 10 to 100 bar, preferably 30 to 70 bar.

Hydrogen is added, when desired, into the first reactor for adjusting the molecular weight of the polymer, as conventional.

After polymerization is complete in the first reactor, the reaction medium is transferred into a second reactor, which can be a gas phase reactor. If the second reactor is also a loop reactor, the same range of polymerization conditions is available as for the first reactor.

In the second reactor, if it is a gas phase reactor, the polymerization can be carried out at a temperature of 50 to 130° C., preferably of 60 to 90° C. and at a pressure higher than 5 bar, preferably higher than 10 bar, more preferably between 15 and 35 bar. Propylene and optionally at least one comonomer selected from an alpha-olefin with 2 or 4 to 8 carbon atoms can be added into the second reactor. Hydrogen can also be added into the gas phase reactor, if desired.

The precise control of the polymerization conditions and reaction parameters is within the state of the art. After polymerization in the first and the optional second reactor is finished, the polymer product is recovered by conventional procedures.

The resulting polymer particles may be pelletized in a conventional compounding extruder with various additives, which are generally used in thermoplastic polymer compositions, such as stabilizers, antioxidants, acid neutralizing agents, ultraviolet absorbers, antistatic agents, slipping agents etc. in a total amount of not more than 5 wt %.

The catalyst system, which is used in the polymerization of the propylene homo- or random copolymers of the present invention, refers to a Ziegler-Natta type catalyst, preferably a high yield Ziegler-Natta catalyst comprising a group 2 metal and a group 6 metal-containing catalyst which comprises an internal electron donor. The catalyst system further comprises a co-catalyst including an aluminium alkyl compound; and an external electron donor including a silane compound. Specific examples for catalyst systems usable according to the present invention are disclosed e.g. in WO 03/000754, and EP 1 484 345, which are all incorporated herein by reference.

According to a preferred embodiment of the invention the high yield Ziegler-Natta olefin polymerization catalyst comprises a component in the form of particles having a predetermined size range which has been produced in a process comprising:

a) preparing a solution of a complex of a Group 2 metal and an electron donor by reacting a compound of said metal with said electron donor or a precursor thereof in an organic liquid reaction medium, b) reacting said complex in solution with a compound of a transition metal, preferably of any of groups 4-6, to produce an emulsion the dispersed phase of which containing more than 50 mol % of the Group 2 metal in said complex.

c) maintaining the particles of said dispersed phase within the average size range of 5 to 200 micrometers, preferably 10 to 100 micrometers, even more preferably 20 to 50 micrometers by agitation in the presence of an emulsion stabilizer and d) solidifying said particles, and recovering, optionally washing said particles to obtain said catalyst component.

The group 2 metal used in the preparation of the catalyst is preferably magnesium and the liquid organic medium for reacting the group 2 metal compound preferably comprises a $C_6$-$C_{10}$ aromatic hydrocarbon, preferably toluene.

An electron donor compound to be reacted with the group 2 metal compound preferably is a mono- or diester of an aromatic carboxylic acid or diacid, the latter being able to form a chelate-like structured complex. Said aromatic carboxylic acid ester or diester can be formed in situ by reaction of an aromatic carboxylic acid chloride or diacid dichloride with a $C_2$-$C_{16}$ alkanol and/or diol, and is preferably dioctyl phthalate or bis-(2-ethylhexyl)phthalate.

The reaction for the preparation of the group 2 metal complex is generally carried out at a temperature of 20 to 80° C., and in case that the group 2 metal is magnesium, the preparation of the magnesium complex may advantageously be carried out at a temperature of 50 to 70° C.

The compound of a group 4-6 metal is preferably a compound of a group 4 metal. The group 4 metal is preferably titanium, and its compound to be reacted with the complex of a group 2 metal is preferably a halide.

In a still further embodiment of the invention, the compound of a group 4-6 metal can also be selected from group 5 and group 6 metals, such as Cu, Fe, Co, Ni and/or Pd compounds.

In a preferred embodiment of the production process of the catalyst a turbulence minimizing agent (TMA) is added to the reaction mixture before solidifying said particles of the dispersed phase, the TMA being inert and soluble in the reaction mixture under reaction conditions.

The turbulence minimizing agent (TMA) or mixtures thereof are preferably polymers having linear aliphatic carbon backbone chains, which might be branched with only short side chains in order to serve for uniform flow conditions when stirring. Said TMA is in particular preferably selected from alpha-olefin polymers having a high molecular weight Mw (as measured by gel permeation chromatography) of about 1 to $40 \times 10^6$, or mixtures thereof. Especially preferred are polymers of alpha-olefin monomers with 6 to 20 carbon atoms, and more preferably polyoctene, polynonene, polydecene, polyundecene or polydodecene or mixtures thereof, having the molecular weight and general backbone structure as defined before. Most preferably the TMA is polydecene.

Usually, said turbulence minimizing agent can be added in any process step before particle formation starts, i.e. at the latest before solidification of the emulsion, and is added to the emulsion in an amount of 1 to 1000 ppm, preferably 5 to 100 ppm and more preferably 5 to 50 ppm, based on the total weight of the reaction mixture.

A preferred embodiment of the process for producing catalysts for preparing propylene homo- or random copolymers of the present invention comprises: preparing a solution of a magnesium complex by reacting alkoxy magnesium compound and an electron donor or precursor thereof in a $C_6$-$C_{10}$ aromatic liquid reaction medium comprising $C_6$-$C_{10}$ aromatic hydrocarbon or a mixture of $C_6$-$C_{10}$ aromatic hydrocarbon and $C_5$-$C_9$ aliphatic hydrocarbon; reacting said magnesium complex with a compound of at least one fourvalent group 4 metal at a temperature greater than 10° C. and less than 60° C., to produce an emulsion of a denser, $TiCl_4$/toluene-insoluble, oil dispersed phase having a group 4 metal/Mg mol ratio of 0.1 to 10 in an oil disperse phase having a group 4 metal/Mg mol ratio of 10 to 100; maintaining the droplets of said dispersed phase within the size range of 5 to 200 micrometers by agitation in the presence of an emulsion stabilizer while heating the emulsion to solidify said droplets and adding turbulence minimizing agent into the reaction mixture before solidifying said droplets of the dispersed phase, said turbulence minimizing agent being inert and soluble in the reaction mixture under reaction conditions; and solidifying said particles of the dispersed phase by heating and recovering the obtained catalyst particles.

The said disperse and dispersed phases are thus distinguishable from one another by the fact that the denser oil, if contacted with a solution of titanium tetrachloride in toluene, will not dissolve in it. A suitable $TiCl_4$/toluene solution for establishing this criterion would be one having a $TiCl_4$/toluene mol ratio of 0.1 to 0.3. The disperse and dispersed phase are also distinguishable by the fact that the great preponderance of the Mg provided (as complex) for the reaction with the group 4 metal compound is present in the dispersed phase, as revealed by comparison of the respective group 4 metal/Mg mol ratios.

In effect, therefore, virtually the entirety of the reaction product of the Mg complex with the group 4 metal, which is the precursor of the final catalyst, becomes the dispersed phase, and proceeds through further processing steps to the final dry particulate form. The disperse phase, still containing a useful quantity of group 4 metal, can be reprocessed for recovery of that metal.

The production of a two-phase, rather than a single phase reaction product is encouraged by carrying out the Mg complex/group 4 metal compound reaction at low temperature, specifically above 10° C. but below 60° C., preferably between 20 and 50° C. Since the two phases will naturally tent to separate into a lower, denser phase and a supernatant lighter phase, it is necessary to maintain the reaction product as an emulsion by agitation, preferably in the presence of an emulsion stabilizer.

The resulting particles from the dispersed phase of the emulsion are of a size, shape (spherical) and uniformity which render the final catalyst extremely effective in olefin polymerization. This morphology is preserved during the heating to solidify the particles, and of course throughout the final washing and drying steps. It is, by contrast, difficult to the point of impossibility to achieve such morphology through precipitation, because of the fundamental uncontrollability of nucleation and growth, and the large number of variables which affect these events.

The electron donor is preferably an aromatic carboxylic acid ester, particularly favored esters being dioctyl phthalate and bis-(2-ethylhexyl)phthalate. The donor may conveniently be formed in situ by reaction of an aromatic carboxylic acid chloride precursor with a $C_2$-$C_{16}$ alkanol and/or diol. The liquid medium preferably comprises toluene.

Furthermore, emulsifying agents/emulsion stabilizers can be used additionally in a manner known in the art for facilitating the formation and/or stability of the emulsion. For said purposes e.g. surfactants, e.g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particularly preferred are unbranched $C_{12}$ to $C_{20}$ acrylates such as poly(hexadecyl)-methacrylate and poly(octadecyl)-methacrylate.

It has been found that the best results are obtained when the group 4 metal/Mg mol ratio of the denser oil is 1 to 5, preferably 2 to 4, and that of the disperse phase oil is 55 to 65. Generally, the ratio of the mol ratio of group 4 metal/Mg in the disperse phase oil to that in the denser oil is at least 10.

Solidification of the dispersed phase droplets by heating is suitably carried out at a temperature of 70 to 150° C., usually at 90 to 110° C.

The finally obtained catalyst is desirably in the form of particles having average size ranges of 5 to 200 micrometers, preferably 10 to 100 micrometers, more preferably 20 to 50 micrometers.

The reagents can be added to the aromatic reaction medium in any order. However, it is preferred that in a first step the alkoxy magnesium compound is reacted with a carboxylic acid halide precursor of the electron donor to form an intermediate; and in a second step the obtained product is further reacted with the group 4 metal. The magnesium compound preferably contains from 1 to 20 carbon atoms per alkoxy group, and the carboxyl acid should contain at least 8 carbon atoms.

Reaction of the magnesium compound, carboxylic acid halide and alcohol proceeds satisfactorily at temperatures in the range of 20 to 80° C., preferably 50 to 70° C. The product of that reaction, the "Mg complex", is reacted with the group 4 metal compound at a lower temperature, to bring about the formation of a two-phase, oil-in-oil, product.

The reaction medium used as solvent can be aromatic or a mixture of aromatic and aliphatic hydrocarbons, the latter one containing preferably 5 to 9 carbon atoms, more preferably 5 to 7 carbon atoms, or mixtures thereof. Preferably, the liquid reaction medium used as solvent in the reaction is aromatic and is more preferably selected from hydrocarbons such as substituted and unsubstituted benzenes, preferably from alkylated benzenes, even more preferably from toluene and the xylenes, and most preferably being toluene. The molar ratio of said aromatic medium to magnesium is preferably less than 10, for instance from 4 to 10, preferably from 5 to 9.

The alkoxy magnesium compound group is preferably selected from the group consisting of magnesium dialkoxides, complexes of magnesium dihalide and an alcohol, and complexes of a magnesium dihalide and a magnesium dialkoxide. It may be a reaction product of an alcohol and a magnesium compound selected from the group consisting of dialkyl magnesium, alkyl magnesium alkoxides, alkyl magnesium halides and magnesium dihalides. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides, and alkyl magnesium aryloxides.

The magnesium dialkoxide may be the reaction product of a magnesium dihalide such as magnesium dichloride or a dialkyl magnesium of the formula $R'_xR''_yMg$, wherein $x+y=2$ and x and y are in the range of 0.3 to 1.7 and each one of R' and R'' is a similar or different $C_1$-$C_{20}$ alkyl, preferably a similar or different $C_4$-$C_{10}$ alkyl. Typical magnesium alkyls are ethylbutyl magnesium, dibutyl magnesium, dipropyl magnesium, propylbutyl magnesium, dipentyl magnesium, butylpentyl magnesium, butyloctyl magnesium and dioctyl magnesium. Preferably R' is a butyl group and R'' is an octyl group, i.e. the dialkyl magnesium compound is butyloctyl magnesium, most preferably the dialkyl magnesium compound is $Mg[(Bu)_{1.5}(Oct)_{0.5}]$.

Dialkyl magnesium, alkyl magnesium alkoxide or magnesium dihalide can react with a polyhydric alcohol $R(OH)_m$, with m being in the range of 2-4, or a monohydric alcohol ROH or mixtures thereof.

Typical $C_2$ to $C_6$ polyhydric alcohol may be straight-chain or branched and include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, and triols such as glycerol, methylol propane and pentaerythritol.

The aromatic reaction medium may also contain a monohydric alcohol, which may be straight or branched chain. Typical $C_1$-$C_5$ monohydric alcohols are methanol, ethanol, n-propanol, iso-propanol, n-butanol, iso-butanol, sec. butanol, tert. butanol, n-amyl alcohol, iso-amyl alcohol, sec. amyl alcohol, tert. amyl alcohol, diethyl carbinol, akt. amyl alcohol, sec. isoamyl alcohol, tert. butyl carbinol. Typical $C_6$-$C_{10}$ monohydric alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol, and 2,7-dimethyl-2-octanol. Typical >$C_{10}$ monohydric alcohols are n-1-undecanol, n-1-dodecanol, n-1-tridecanol, n-1-tetradecanol, n-1-pentadecanol, n-1-hexadecanol, n-1-heptadecanol, and n-1-octadecanol. The monohydric alcohols may be unsaturated, as long as they do not act as catalyst poisons.

Preferable monohydric alcohols are those of formula ROH in which R is a $C_2$-$C_{16}$ alkyl group, most preferably a $C_4$-$C_{12}$ alkyl group, particularly 2-ethyl-1-hexanol or 1-octanol.

Preferably, essentially all of the aromatic carboxylic acid ester is a reaction product of a carboxylic acid halide, preferably a dicarboxylic acid dihalide, more preferably an unsaturated dicarboxylic acid dihalide, most preferably phthalic acid dichloride, with the monohydric alcohol.

The compound of a fourvalent group 4 metal containing a halogen is preferably a titanium tetrahalide. Equivalent to titanium tetrahalide is the combination of an alkoxy titanium halide and a halogenation agent, which are able to form a titanium tetrahalide in situ. The most preferred halide is the chloride.

As is known, the addition of the at least one halogenated hydrocarbon during the catalyst preparation process can lead to further improved catalytic activity. Reactive halogenated hydrocarbons preferably have the formula $R'''X'''_n$, wherein $R'''$ is a $C_1$-$C_{20}$ hydrocarbyl group, particularly a $C_1$-$C_{10}$ aliphatic hydrocarbyl group, $X'''$ is a halogen, preferably chlorine, and n is an integer from 1 to 4.

Such chlorinated hydrocarbons include monochloromethane, dichloromethane, trichloromethane (chloroform), tetrachloromethane, monochloroethane, (1,1)-dichloroethane, (1,1)-dichloroethane, (1,1,1)-trichloroethane, (1,1,2)-trichloroethane, (1,1,1,2)-tetrachlororethane, (1,1,2,2)-tetrachloroethane, pentachloroethane, hexachloroethane, 1-chloropropane, 2-chloropropane, (1,2)-dichloropropane, (1,3)-dichloropropane, (1,2,3)-trichloropropane, 1-chlorobutane, 2-chlorobutane, isobutyl chloride, tert. butyl chloride, (1,4)-dichlorobutane, 1-chloropentane, and (1,5)-dichloropentane. The chlorinated hydrocarbons may also be unsaturated, provided that the unsaturation does not act as catalyst poison in the final catalyst.

In the above formula, $R'''$ is preferably a $C_1$-$C_{10}$ alkyl group, $X'''$ is preferably chlorine and n is preferably 1 or 2. Preferred compounds include butyl chloride (BuCl), dichloroalkanes such as (1,4)-dichlorobutane, and tertiary butyl chloride.

The catalyst preparation as described herein can be carried out batchwise, semi-continuously or continuously. In such a semi-continuous or continuous process, the solution of the complex of the group 2 metal and said electron donor, which is prepared by reacting the compound of said metal with said electron donor in an organic liquid reaction medium, is mixed with at least one compound of a transition metal which might be solved in the same or different organic liquid reaction medium. The so obtained solution is then agitated, possibly in the presence of an emulsion stabilizer, and then the agitated emulsion is fed into a temperature gradient reactor, in which the emulsion is subjected to a temperature gradient, thus leading to solidifying the droplets of a dispersed phase of the emulsion. The TMA is preferably contained in the solution of the complex or added to the solution before feeding the agitated solution to the temperature gradient reactor.

When feeding said agitated emulsion to the temperature gradient reactor, an inert solvent, in which the droplets are not soluble, can additionally be fed into that gradient reactor in order to improve that droplet formation and thus leading to a uniform grain size of the particles of the catalyst, which are formed in the temperature gradient reactor when passing through said line. Such additional solvent might be the same as the organic liquid reaction medium, which is used for preparing the solution of the complex of the group 2 metal as explained above in more detail.

The solidified particles of the catalyst can subsequently be recovered by an in-stream filtering unit and are preferably subjected to washing in order to remove unreacted starting components.

The recovered particulate product is washed at least once, preferably at least twice, most preferably at least three times with a hydrocarbon, which is preferably selected from aromatic and aliphatic hydrocarbons, preferably with toluene, particularly with hot (e.g. 90° C.) toluene, which may include a small amount, preferably about 0.01-10 vol % of $TiCl_4$ or an alkyl aluminium chloride, such as diethyl aluminium chloride (DEAC), in it. A further washing step is advantageous performed with heptane, most preferably with hot (e.g. 90° C.) heptane, and a still further washing step with pentane. A washing step typically includes several substeps. A favored washing sequence is, for example, one washing step with toluene at 90° C., two washing steps with heptane at 90° C. and one or two washing steps with pentane at room temperature.

Finally, the washed catalyst is dried, e.g. by evaporation or flushing with nitrogen.

After washing and drying the catalyst can be stored for further use or can be subjected to further treatment steps or can immediately be fed to a polymerization reactor.

The catalyst system which is used according to the present invention also comprises an aluminium alkyl compound, preferably of the general formula $AlR_{3-n}X_n$ wherein R stands for straight chain or branched alkyl group having 1 to 20, preferably 1 to 10 and more preferably 1 to 6 carbon atoms, X stands for halogen and n stands for 0, 1, 2 or 3, which aluminium alkyl compound is added, and brought into contact with the droplets of the dispersed phase of the agitated emulsion before recovering the solidified particles of the catalyst.

It is further preferred that at least a part of the aluminium compound is added, in pure form or in the form of a solution, from shortly before the beginning of the emulsion formation until adding it to the washing liquid, e.g. toluene, in such an amount that the final Al content of the particles is from 0.05 to 1 wt %, preferably 0.1 to 0.8 wt % and most preferably 0.2 to 0.7 wt %. by weight of the final catalyst particles. The most preferred Al content may vary depending upon the type of the Al compound and on the adding step. For example, in some cases the most preferred amount may be 0.1 to 0.4 wt %.

Still further, preferably tri-($C_1$-$C_6$)-alkyl aluminium compounds are used, triethylaluminium being most preferred.

In Ziegler-Natta catalysts alumimium alkyl compounds are used as cocatalysts, i.e. for activating the catalyst. During activation of polypropylene catalysts, alkyl aluminium does not only reduce and alkylate the active metal, but it has also influence on the donor composition. It is well-known that alkyl aluminium compounds can remove carboxylic acid esters, which are used as internal donors. Simultaneously, external donors can be fixed on the catalyst. Typically, triethyl aluminium (TEAl) is used as cocatalyst and silanes as external donors as is disclosed e.g. in articles Sacci, M. C.; Forlini, F.; Tritto, I and Locatelli, P., Macromolecules, 1996, 29, 3341-3345 and Sacci, M. C.; Tritto, I.; Shan, C. and Mendichi, R., Macromolecules, 1991, 24, 6823-6826.

In the catalysts used in the present invention, the internal donor, preferably bis-(2-ethylhexyl)phthalate (DOP), can be significantly extracted from the catalyst with the use of the alkyl aluminium compound. The extraction level is dependent on the concentration of the aluminium alkyl. The higher the concentration, the more of the internal donor can be extracted. Further, the addition of the external donor together with aluminium alkyl improves the donor exchange. The longer the reaction time is, the more external donor is bound on the catalyst.

Particularly preferred external donors are any of the following: cyclohexyl methyl dimethyloxysilane, dicyclopentyl dimethoxysilane, diisopropyl dimethoxysilane, di-isobutyl dimethoxysilane and di-tert.-butyl dimethoxysilane. Most preferred are cyclohexyl methyl dimethoxysilane and dicyclopentyl dimethoxysilane, cyclohexyl methyl dimethoxysilane being particularly preferred.

It is preferred that a solution containing alkyl aluminium and external donor in an organic solvent, e.g. pentane, are added to the catalyst after solidification of the catalyst particles.

The catalyst which is obtained by the above described process is a non-supported Ziegler-Natta catalyst. Non-supported catalysts do not use any external carrier, contrary to conventional catalysts, e.g. conventional Ziegler-Natta catalysts, which are e.g. supported on silica or $MgCl_2$.

Further preferred embodiments of the catalyst system production include all preferred embodiments as described in WO 03/000754.

The present invention further relates to the use of the polypropylene composition of the invention for the production of a film and/or injection molded articles.

Moreover, the present invention relates to a process for preparing a film, wherein the inventive polypropylene composition is formed into a film and wherein the polypropylene composition is not subjected to a vis-breaking step. The films may be prepared by any process known to the skilled person, but are preferably produced by a cast film process or a blown film process. A roll stack process may also be used.

The films comprising the inventive polypropylene composition may be produced with varying thickness, preferably between 20 and 400 micrometers more preferably between 30 and 300 micrometers.

The present invention is further characterized by the following examples.

EXAMPLES

1. Definitions:
a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg, the $MFR_5$ of polyethylene is measured at a temperature 190° C. and a load of 5 kg and the $MFR_2$ of polyethylene at a temperature 190° C. and a load of 2.16 kg.

b) Weight Average Molecular Weight and MWD

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 ml/min. 216.5 µl of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 ml (at 160° C.) of stabilized TCB (same as mobile phase) and keeping for 3 hours with continuous shaking prior sampling in into the GPC instrument.

In case of PP the constants are: K: $19 \times 10^{-3}$ ml/g and a: 0.725 c) Xylene Soluble Fraction

The xylene soluble fraction (XCS) as defined and described in the present invention is determined as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XCS\% = (100 \times m_1 \times v_0)/(m_0 \times v_1),$$

wherein $m_0$ designates the initial polymer amount (grams), $m_1$ defines the weight of residue (grams), $v_0$ defines the initial volume (milliliter) and $v_1$ defines the volume of the analysed sample (milliliter). The fraction insoluble in p-xylene at 25° C. (XCU) is then equal to 100%−XCS%.

d) Comonomer Content

Comonomer content is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —$CH_2$— absorption peak (800–650 cm−1) was measured with Perkin Elmer FTIR 1600 spectrometer. The method was calibrated by ethylene content data measured by $^{13}$C-NMR.

e) Emission of Volatiles

The content of volatiles is determined according to VDA 277:1995 using a gas chromatography (GC) device with a WCOT-capillary column (wax type with 0.25μ film thickness) of 0.25 mm inner diameter and 30 m length. The GC settings were as follows: 3 minutes isothermal at 50° C., heat up to 200° C. at 12 K/min, 4 minutes isothermal at 200° C., injection-temperature: 200° C., detection-temperature: 250° C., carrier helium, flow-mode split 1:20 and average carrier-speed 22-27 cm/s.

f) Sealing

1. General

The method determines the sealing temperature range of polypropylene films. The sealing temperature range is the temperature range, in which the films can be sealed according to conditions given below.

The lower limit (heat sealing initiation temperature (SIT)) is the sealing temperature at which a sealing strength of >5 N is achieved. The upper limit (sealing end temperature (SET)) is reached, when the films stick to the sealing device.

2. Sample Geometry and Sample Preparation

The samples were extruded with OCS at 220° C. and taken in longitudinal direction of extrusion. The sample size was 45 mm×170 mm, the film thickness was 50 micrometers for propylene homopolymers and 50 micrometers and 130 micrometers for propylene random copolymers.

3. Sealing Device

For sealing the laboratory sealing device KOPP SGPE-20 was used. Prior to the test, the device was checked for the parallel position of the sealing jaws.

4. Sealing Parameters

The sealing parameters were set to:
Sealing force: 600 N
Sealing time: 1 s
Sealing jaws: 100×20 mm, smooth
Heating: both jaws, precision +/−1° C.
Start temperature: 100° C.

5. Sealing Procedure

Stripes were folded to 85×45 mm and put between the sealing jaws.

The jaws were heated to sealing temperature

Immediately after sealing, the sample was taken out of the device

For each temperature, 10 samples were sealed

6. Testing

To determine the initial strength, samples were sealed at one temperature setting and with KOPP SGPE-20-IMPULS tested for the sealing strength.

If the mean value of 10 tests—as described above—was >5 N, then the heat sealing initiation temperature (SIT) was reached. If not, the sealing temperature was increased by 2° C. and the test was repeated.

After having reached the heat sealing initiation temperature (SIT), the sealing temperature was further increased in steps of 2° C. until the film sticks to the sealing jaws.

After taking the sealed film from the device, 5 minutes were waited before the film was stretched with a take-off speed of 2.5 m/min to measure the sealing strength in Newton. The heat sealing initiation temperature (SIT) is the temperature where a sealing strength of >5 N was reached.

The sealing end temperature (SET) is the temperature where the film sticked to the sealing jaws.

The precision of the method was determined by the temperature steps, i.e. 2° C.

g) Transparency, Haze, Clarity, Gloss

Transparency, haze and clarity were determined on cast films with a thickness of 30 μm, 50 μm, 80 μm and 130 μm for propylene random copolymers and with a thickness of 30 μm, 50 μm, 80 μm and 300 μm for propylene homopolymers according to ASTM D 1003/92.

Gloss was determined on cast films with a thickness of 30 μm, 50 μm, 80 μm and 130 μm for propylene random copolymers and with a thickness of 30 μm, 50 μm, 80 μm and 300 μm for propylene homopolymers according to DIN 67530 at an angle of 20°.

The retortability performance in terms of transparency, haze and clarity was determined according to ASTM D 1003 by measuring those optical parameters after steam sterilization at 121° C. for 30 min on cast films with a thickness of 50 μm and 130 μm for propylene random copolymers and with a thickness of 50 μm for propylene homopolymers.

The blooming (pasteurization) performance in terms of transparency, haze, clarity, gloss inside (of roll) and gloss outside (of roll) was determined according to an internal standard in line with pasteurization conditions by measuring those optical parameters after incubation at 70° C. for 72 h on cast films with a thickness of 80 μm for both propylene random copolymers and propylene homopolymers.

h) Coefficient of Friction (CoF)

The dynamic Coefficient of Friction (CoF) as a measure of the frictional behaviour of the film was determined according to DIN 53 375 on film samples with a thickness of 30 μm for both propylene random copolymers and homopolymers. Immediately after film production the film has been stored at room temperature (23° C. for 144 min, 1 day, 3 days, 7 days and 21 days. Measurement of CoF was then performed at 23° C. on the inside of the film roll (inside/inside—friction).

i) Tensile Modulus Film TD (Transversal Direction), Tensile Modulus Film MD (Machine Direction), Elongation at Break TD and Elongation at Break MD:

Tensile moduli in machine and transverse direction were determined according to ISO 527-3 on 50 μm films at a cross head speed of 1 mm/min. Subsequently elongation at break in machine and transverse direction were determined according to ISO-527-3 on the same specimens using a cross head speed of 50 mm/min. Test speed was changed after a deformation of 0.25%.

j) Impact Strength of Films (Dynatest) at +23° C.

The impact strength of films is determined according to ISO 7725-2 on monolayer cast films with a thickness of 50 μm. The value "$W_{break}$" [J/mm] represents the total energy per mm thickness that a film can absorb before it breaks. The higher this value, the tougher the material is.

2. Materials a) Preparation of the Catalyst for Inventive Examples 1 and 2

Preparation of the Mg-complex

In a 150 l steel reactor 19.3 kg of 2-ethyl hexane-1-ol were added at 20° C. 56.0 kg of a 20% BOMAG A (Tradename) [$Mg(Bu)_{1.5}(Oct)_{0.5}$] solution in toluene were then slowly added to the well stirred alcohol. The temperature of the mixture was then increased to 60° C., and the reactants were allowed to react for 30 min at this temperature. After addition of 5.5 kg of 1,2-phthaloyl dichloride, the reaction mixture was stirred at 60° C. for another 30 min to ensure complete reaction. 13.8 kg of 1-chloro butane were then added at 60° C., and stirring at this temperature was continued for 30 min. After cooling to room temperature a yellow solution was obtained.

Preparation of the Catalyst 100 ml titanium chloride were placed in a 1 l reactor equipped with a mechanical stirrer. Mixing speed was adjusted to 110 rpm. After addition of 50 ml n-heptane, 180 ml of the Mg-complex solution was added to the well-stirred reaction mixture at 25° C. within 10 min. After addition a dark red emulsion was formed. After addition of the Mg-complex, 15 ml of toluene solution containing 45 mg polydecene was added. Then 10 ml of Viscoplex® 1-254 was added. 10 min after addition the temperature of the reactor was increased to 90° C. and stirring at this temperature was continued for 30 min. After settling and filtering, the solid was washed with 200 ml of toluene containing 0.1 vol % diethyl aluminium chloride at 90° C. for 35 min. Then the washings were continued with two times 150 ml heptane for 10 min. Then the catalyst was taken out from the reactor to a separate drying vessel as a slurry with 100 ml of heptane. Finally, the solid catalyst was dried at 60° C. by purging nitrogen through the catalyst bed.

b) Polymerisation of Inventive Propylene Homopolymer 1 (Ex 1)

The PP homo- and copolymers were produced in a pilot plant having a loop reactor to which the catalyst, cocatalyst and donor were fed in a premixed form. The ratio between the monomer feed and the TEAl-feed was set at 0.20 g/kg, cyclohexyl-methyl-dimethoxysilane ("donor C", supplied by Wacker, Germany) at a ratio TEAl/donor of 15 g/g was used. At a temperature of 71° C. and a pressure of 34.5 bars polymerization was carried out in liquid phase at a production rate of 65.2 kg/h, adjusting the hydrogen feed such as to achieve a product MFR of 6.8 g/10 min. A catalyst productivity of 18.9 kg/g was achieved, and the resulting polymer had a xylene solubles content of 2.0 wt %.

c) Polymerisation of Inventive Propylene Random Copolymer 2 (Ex 2)

The same polymerization setup and conditions as for Ex 1 were used, changing the ratio TEAl/donor to 4 g/g and the temperature to 70° C. Ethylene was fed as comonomer together with the liquid propylene in a suitable concentration as to achieve a final ethylene content of 3.5 wt %, resulting in a production rate of 67.1 kg/h. The hydrogen feed was adjusted as to achieve a product MFR of 6.0 g/10 min. A catalyst productivity of 47.4 kg/g was achieved, and the resulting polymer had a xylene solubles content of 4.4 wt %.

d) Polymerisation of Comparative Propylene Homopolymer 1 (CE 1)

The same polymerization setup and conditions as for Ex 1 were used, this time with Avant MC-L1 (supplied by Lyondell-Basell, Italy) as catalyst and a ratio TEAl/donor of 15 g/g. At a production rate of 63.5 kg/h the hydrogen feed was adjusted as to achieve a product MFR of 2.8 g/10 min.

A catalyst productivity of 32.4 kg/g was achieved, and the resulting polymer had a xylene solubles content of 3.8 wt %.

In the compounding step outlined below the polymer was visbroken by addition of 1.2 wt % of a masterbatch containing a propylene homopolymer and 5 wt % 2,5-bis(tert.butylperoxy)-2,5-dimethylhexane (Trigonox® 101, distributed by Akzo Nobel, Netherlands) to achieve a final MFR of 7.1 g/10 min.

e) Polymerisation of Comparative Propylene Random Copolymer 2 (CE 2)

The same polymerization setup and conditions as for Ex 1 were used, changing the ratio TEAl/donor to 4 g/g and the temperature to 70° C. Ethylene was fed as comonomer together with the liquid propylene in a suitable concentration as to achieve a final ethylene content of 3.9 wt %, resulting in a production rate of 63.9 kg/h. The hydrogen feed was adjusted as to achieve a product MFR of 1.4 g/10 min. A catalyst productivity of 52.1 kg/g was achieved, and the resulting polymer had a xylene solubles content of 6.8 wt %. In the compounding step outlined below the polymer was visbroken by addition of 2.0 wt % of a masterbatch containing a propylene homopolymer and 5 wt % 2,5-bis(tert.butylperoxy)-2,5-dimethylhexane (Trigonox® 101, distributed by Akzo Nobel, Netherlands) to achieve a final MFR of 7.5 g/10 min.

f) Compounding of Reactor Polymer Powders

The powders of inventive examples 1 and 2 as well as comparative examples 1 and 2 were compounded with 0.1 wt % of Irganox B215 (antioxidant masterbatch supplied by Ciba Specialty Chemicals, Switzerland), 0.2 wt % erucic acid amide, and 0.18 wt % synthetic silica (Gasil® AB725 for Ex1, Ex2 and CE1; Sylobloc® 45 for CE2) on a twin-screw extruder at 200-250° C.

The polypropylene compositions of Comparative Examples CE1 and CE2 were subjected to a vis-breaking step with peroxide as indicated above. The inventive polypropylene compositions of Examples 1 and 2 were not subjected to a vis-breaking step.

g) Preparation of Cast Films

Cast films were produced on a single screw extruder with a barrel diameter of 30 mm and a slot die of 200×0.5 mm in combination with a chill- and take-up roll. Melt temperature was 260° C. in the die. The chill roll and the take-up roll were kept at 15° C. Film thickness of 30 µm, 50 µm, 80 µm, 130 µm and 300 µm were adjusted by varying the ratio between the extruder output and the take-off speed.

The results are shown in Table 1 for the films made of propylene homopolymers (Example 1 and Comparative Example 1) and in Table 2 for the films made of propylene random copolymers (Example 2 and Comparative Example 2)

TABLE 1

| Properties of films made of propylene homopolymers | | |
|---|---|---|
| | Ex1 | CE1 |
| Polymer properties: | | |
| Mw [kg/mol] | 340 | 358 |
| Mn [kg/mol] | 80 | 89 |
| MWD | 4.3 | 4.1 |
| MFR   start | 6.8 | 2.8 |
| end | 6.8 | 7.1 |

TABLE 1-continued

Properties of films made of propylene homopolymers

|  | Ex1 | | | | CE1 | | | |
|---|---|---|---|---|---|---|---|---|
| Volatiles [μg C/g] | 25 | | | | 170 | | | |
| Film properties: | | | | | | | | |
| Thickness of film [μm] | 30 | 50 | 80 | 300 | 30 | 50 | 80 | 300 |
| SIT [° C.] | | 132 | | | | 132 | | |
| SET [° C.] | | 140 | | | | 140 | | |
| Gloss inside [%] | 103.0 | 115.6 | 105.6 | 98.2 | 107.1 | 110.0 | 90.5 | 102.8 |
| Gloss outside [%] | 101.5 | 112.9 | 101.7 | 97.7 | 101.8 | 104.6 | 85.5 | 103.6 |
| Transparency [%] | 94.4 | 94.2 | 94.1 | 94.7 | 94.4 | 94.3 | 94.0 | 95.4 |
| Haze [%] | 3.4 | 3.2 | 4.8 | 30.2 | 3.3 | 3.6 | 7.0 | 28.4 |
| Clarity [%] | 96.8 | 97.0 | 96.9 | 92.2 | 97.1 | 97.3 | 96.6 | 96.5 |
| Transparency [%] (121° C., 30 min) | | 93.8 | | | | 93.7 | | |
| Haze [%] (121° C., 30 min) | | 5.8 | | | | 7.3 | | |
| Clarity [%] (121° C., 30 min) | | 96.5 | | | | 96.7 | | |
| Gloss inside [%] (70° C., 72 h) | | | 105.2 | | | | 96.9 | |
| Gloss outside [%] (70° C., 72 h) | | | 100.3 | | | | 89.3 | |
| Transparency [%] (70° C., 72 h) | | | 94.0 | | | | 93.9 | |
| Haze [%] (70° C., 72 h) | | | 4.4 | | | | 5.8 | |
| Clarity [%] (70° C., 72 h) | | | 96.8 | | | | 96.7 | |
| CoF (inside/inside) | | | | | | | | |
| 144 min | | 0.921 | | | | 0.830 | | |
| 1 day | | 0.591 | | | | 0.591 | | |
| 3 days | | 0.443 | | | | 0.455 | | |
| 7 days | | 0.355 | | | | 0.435 | | |
| 21 days | | 0.241 | | | | 0.315 | | |
| Tens. Mod. MD [MPa] | | 724 | | 1007 | | 794 | | 1282 |
| Elong at break MD [%] | | 640 | | 834 | | 654 | | 753 |
| Tens. Mod. TD [MPa] | | 726 | | 995 | | 801 | | 1201 |
| Elong. at break TD [%] | | 624 | | 1061 | | 656 | | 529 |
| Dynatest 23° C. $W_{break}$ [J/mm] | | 15.7 | | 2.9 | | 14.3 | | 1.1 |

TABLE 2

Properties of films made of propylene random copolymers

|  | Ex2 | | | | CE2 | | | |
|---|---|---|---|---|---|---|---|---|
| Polymer properties: | | | | | | | | |
| C2 content [wt %] | | 3.5 | | | | 4.0 | | |
| Mw [kg/mol] | | 365 | | | | 340 | | |
| Mn [kg/mol] | | 85 | | | | 85 | | |
| MWD | | 4.3 | | | | 4.0 | | |
| MFR     start | | 6.0 | | | | 1.4 | | |
|              end | | 6.0 | | | | 7.5 | | |
| Volatiles [μg C/g] | | 15 | | | | 135 | | |
| Film properties: | | | | | | | | |
| Thickness of film [μm] | 30 | 50 | 80 | 130 | 30 | 50 | 80 | 130 |
| SIT [° C.] | | 116 | | 120 | | 118 | | 124 |
| SET [° C.] | | 124 | | 140 | | 126 | | 142 |
| Gloss inside [%] | 122.6 | 127.0 | 127.4 | 123.4 | 122.3 | 125.2 | 126.5 | 121.8 |
| Gloss outside [%] | 122.3 | 127.5 | 126.3 | 122.5 | 122.1 | 124.9 | 127.3 | 123.3 |
| Transparency [%] | 94.5 | 94.4 | 94.4 | 94.1 | 94.8 | 94.4 | 94.4 | 94.2 |
| Haze [%] | 1.8 | 1.7 | 1.7 | 3.3 | 1.8 | 1.7 | 1.6 | 2.3 |
| Clarity [%] | 96.4 | 96.7 | 96.9 | 97.1 | 95.6 | 96.1 | 96.5 | 96.8 |
| Transparency [%] (121° C., 30 min) | | 94.3 | | 93.7 | | 94.4 | | 93.5 |
| Haze [%] (121° C., 30 min) | | 5.5 | | 6.6 | | 13.9 | | 14.7 |

TABLE 2-continued

Properties of films made of propylene random copolymers

| | Ex2 | | CE2 | |
|---|---|---|---|---|
| Clarity [%] (121° C., 30 min) | 95.5 | 94.9 | 92.6 | 91.1 |
| Transparency [%] (70° C., 72 h) | | 94.3 | | 94.4 |
| Haze [%] (70° C., 72 h) | | 1.8 | | 3.3 |
| Clarity [%] (70° C., 72 h) | | 96.7 | | 96.3 |
| CoF (inside/inside) | | | | |
| 144 min | 1.209 | | 1.161 | |
| 1 day | 0.247 | | 0.448 | |
| 3 days | 0.105 | | 0.250 | |
| 7 days | 0.104 | | 0.176 | |
| 21 days | 0.105 | | 0.177 | |
| Tens. Mod. MD [MPa] | 514 | 550 | 444 | 463 |
| Elong at break MD [%] | 573 | 582 | 511 | 598 |
| Tens. Mod. TD [MPa] | 536 | 542 | 450 | 566 |
| Elong. at break TD [%] | 620 | 624 | 687 | 641 |
| Dynatest 23° C. $W_{break}$ [J/mm] | 32.5 | 17.8 | 31.3 | 16.5 |

The invention claimed is:

1. Polypropylene composition comprising a propylene homopolymer or a propylene random copolymer having at least one comonomer selected from alpha-olefins with 2 or 4-8 carbon atoms and a comonomer content of not more than 8.0 wt %, wherein
the propylene homo- or copolymer is polymerized in the presence of a Ziegler-Natta catalyst, and
the polypropylene composition has a MWD of 3.5 to 6.0 and an MFR (2.16 kg/230° C.) of 4.0 g/10 min to 20.0 g/10 min determined according to ISO 1133,
characterized in that the polypropylene composition has not been subjected to a vis-breaking step,
has a haze of not more than 3.5%, determined according to ASTM D 1003/92, when cast into a film with a thickness of 50 micrometers,
has a clarity of at least 96.0%, determined according to ASTM D 1003/92, when cast into a film with a thickness of 50 micrometers, and
wherein the polypropylene composition has a tensile modulus in machine direction and in transverse direction of at least 450 MPa, determined according to ISO 527-3, when cast into a film with a thickness of 50 micrometers.

2. Polypropylene composition according to claim 1 wherein polypropylene composition has an amount of volatiles of 50 microgram C/g or less, determined according to VDA 277:1995.

3. Polypropylene composition according to claim 1 wherein the polypropylene composition has a sealing initiation temperature (SIT) of less than 135° C. and an interval between SIT and the sealing end temperature (SET) of at least 6° C. when cast into a film with a thickness of 50 micrometers.

4. Polypropylene composition according to claim 1 wherein the polypropylene composition has a gloss of at least 110%, determined according to DIN 67530 at an angle of 20°, when cast into a film with a thickness of 50 micrometers.

5. Polypropylene composition according to claim 1 wherein the polypropylene composition has a transparency of at least 94.0%, determined according to ASTM D 1003/92, when cast into a film with a thickness of 50 micrometers.

6. Polypropylene composition according to claim 1 wherein the polypropylene composition comprising a propylene random copolymer has a coefficient of friction (CoF) of not more than 0.115, determined according to DIN 53 375, three days after casting into a film with a thickness of 30 micrometers.

7. Polypropylene composition according to claim 1 wherein the polypropylene composition comprising a propylene homopolymer has a coefficient of friction (CoF) of not more than 0.250, determined according to DIN 53 375, 21 days after casting into a film with a thickness of 30 micrometers.

8. Polypropylene composition according to claim 1 wherein the comonomer is ethylene.

9. Polypropylene composition according to claim 1 wherein the propylene homo- or copolymer is obtainable by a process which comprises the polymerization of propylene monomers or propylene monomers and one or more types of comonomers in the presence of a high yield Ziegler-Natta olefin polymerization catalyst, which catalyst comprises a component in the form of particles having a predetermined size range which has been produced in a process comprising:
 a. preparing a solution of a complex of a Group 2 metal and an electron donor by reacting a compound of said metal with said electron donor or a precursor thereof in an organic liquid reaction medium,
 b. reacting said complex in solution with a compound of a transition metal to produce an emulsion the dispersed phase of which containing more than 50 mol % of the Group 2 metal in said complex,
 c. maintaining the particles of said dispersed phase within the average size range of 5 to 200 micrometers by agitation in the presence of an emulsion stabilizer and
 d. solidifying said particles, and recovering, optionally washing said particles to obtain said catalyst component.

10. A process for preparing a film wherein the polypropylene composition according to claim 1 is formed into a film, and wherein the polypropylene composition has not been subjected to a vis-breaking step.

11. A film comprising the polypropylene composition according to claim 1.

* * * * *